No. 734,485. Patented July 21, 1903.

UNITED STATES PATENT OFFICE.

EDWIN WILDING AND ALFRED HOWARD STOTT, OF LONDON, ENGLAND.

CLEANER AND RENOVATOR FOR WOOD.

SPECIFICATION forming part of Letters Patent No. 734,485, dated July 21, 1903.

Application filed October 15, 1902. Serial No. 127,338. (No specimens.)

*To all whom it may concern:*

Be it known that we, EDWIN WILDING, chartered accountant, residing at No. 2 Clement's Inn, Strand, and ALFRED HOWARD STOTT, traveler, residing at No. 18 Upper Woburn Place, London, in the county of Middlesex, England, subjects of the King of Great Britain, have invented a certain new and useful Cleaner and Renovator for Wood or the Like Surfaces, of which the following is a specification.

This invention relates to a cleaner and renovator for wood or the like surfaces, and is particularly applicable for use in cleansing the exterior woodwork of railway and other cars and carriages, while at the same time its application may be extended to any articles of wood having a polished, varnished, or similarly-treated surface.

The product hereinafter described is particularly rapid in its action, free from any ingredients which are at all detrimental to the painted and varnished surfaces of woodwork, stonework, and the like, and while having a cleansing action upon brass or other such metal fittings is free from any corrosive effect with regard to same, while at the same time it acts as an excellent disinfectant.

In carrying this invention into effect the product consists of the following ingredients and proportions, the latter of which may be varied without departing from the nature of this invention: flour of cereals or wood-pulp, thirty-eight and one-half per cent. weight; muriatic acid, forty-five per cent. weight; chlorid of calcium, sixteen per cent. weight; turpentine, one-half per cent. weight. The above ingredients having been thoroughly well mixed to form a thin paste, the woodwork to be treated is coated with the preparation, which is allowed to remain for a short period. The paste is then removed by being thoroughly washed off with the aid of a soft leather or brush, in the course of which all the dirt, grease, and other deleterious matter is removed, leaving a perfectly clean surface, which by the application of a small amount of rubbing with a soft cloth or leather produces a polished surface on the wood and leaves the metal fittings bright.

The inclusion of the chlorid of calcium tends to retain the paste in a state of moisture in any temperature for a considerable period, thus allowing of its easy removal without damage to the polish or varnish, while the terebine forms a disinfectant and obviates any objectionable smell when using the product.

Having now described our invention, what we claim as new, and desire to secure by Letters Patent, is—

1. A cleaner and renovator for the purpose described, consisting of a vegetable flour, an acid, calcium chlorid and turpentine.

2. A cleanser and renovator for the purpose described, comprising a vegetable flour, muriatic acid, chlorid of calcium and turpentine.

3. A cleanser and renovator for the purpose set forth, comprising a cereal flour, an acid, chlorid of calcium and turpentine.

4. A cleanser and renovator for the purpose set forth, comprising a cereal flour, muriatic acid, chlorid of calcium and turpentine.

In witness whereof we have hereunto set our hands in the presence of two witnesses.

EDWIN WILDING.
ALFRED HOWARD STOTT.

Witnesses:
HERBERT E. NEWTON,
VICTOR D. GEDDES.